(12) United States Patent
Kumakura et al.

(10) Patent No.: US 7,382,069 B2
(45) Date of Patent: Jun. 3, 2008

(54) ROTARY ELECTRIC APPARATUS WITH COIL-END BLOCK FROM WHICH LEAD WIRES ARE DRAWN OUT

(75) Inventors: Takashi Kumakura, Nishio (JP); Tetsuya Gorohata, Anjo (JP)

(73) Assignee: Denso Corporation, Kariya (JP)

( * ) Notice: Subject to any disclaimer, the term of this patent is extended or adjusted under 35 U.S.C. 154(b) by 316 days.

(21) Appl. No.: 11/129,355

(22) Filed: May 16, 2005

(65) Prior Publication Data

US 2005/0275296 A1 Dec. 15, 2005

(30) Foreign Application Priority Data

May 14, 2004 (JP) ............... 2004-144572

(51) Int. Cl.
*H02K 3/00* (2006.01)
*H02K 3/04* (2006.01)
(52) U.S. Cl. .................. 310/71; 310/201; 310/208
(58) Field of Classification Search .............. 310/71, 310/201, 208
See application file for complete search history.

(56) References Cited

U.S. PATENT DOCUMENTS

| 3,979,615 | A | * | 9/1976 | Neff ............... 310/71 |
| 4,177,397 | A | * | 12/1979 | Lill ............... 310/71 |
| 4,219,748 | A | * | 8/1980 | Sakaguchi et al. ........ 310/71 |
| 4,260,917 | A | * | 4/1981 | Lundin et al. ........ 310/71 |
| 4,611,138 | A | * | 9/1986 | Kindig et al. .......... 310/71 |
| 6,268,678 | B1 | * | 7/2001 | Asao et al. ........... 310/201 |
| 6,373,163 | B1 | * | 4/2002 | Oohashi et al. ........ 310/198 |
| 6,624,544 | B2 | * | 9/2003 | Higashino et al. ....... 310/201 |
| 7,145,273 | B2 | * | 12/2006 | Even et al. ........... 310/71 |
| 7,170,210 | B2 | * | 1/2007 | Even et al. ........... 310/201 |

FOREIGN PATENT DOCUMENTS

| JP | A 6-153436 | 5/1994 |
| JP | A 11-178264 | 7/1999 |
| JP | A 2002-335657 | 11/2002 |

* cited by examiner

*Primary Examiner*—Tran Nguyen
(74) *Attorney, Agent, or Firm*—Oliff & Berridge, PLC

(57) ABSTRACT

A rotary electric apparatus, such as motor, comprises a rotor and a stator arranged to face the rotor in the radial direction. The rotor rotates together with a rotation shaft. The stator has a cylindrical stator core, a stator winding wound in the stator core to have coil-end blocks arranged to protrude respectively from both ends of the stator core in the axial direction and being arranged on both sides of the stator core in the circumferential direction, and a lead wire taken from the windings. The lead wire includes a first wire portion taken along the axial direction from one of the coil-end blocks, a second wire portion extended from the first wire portion and arranged partly along the circumferential direction to be secured with resin material on the coil-end block, and a third wire portion extended from the second wire portion and arranged outwards in the radial direction.

14 Claims, 7 Drawing Sheets

ROTARY ELECTRIC APPARATUS WITH COIL-END BLOCK FROM WHICH LEAD WIRES ARE DRAWN OUT

CROSS REFERENCES TO RELATED APPLICATIONS

The present application relates to and incorporates by reference Japanese Patent application No. 2004-144572 filed on May 14, 2004.

BACKGROUND OF THE INVENTION

1. Field of the Invention

The present invention relates to rotary electric apparatuses, such as electric motors and electric generators, mounted on automobiles and trucks, and in particular, to a rotary electric apparatus in which stator windings are wound to have coil-end blocks from one of which lead wires are drawn out.

2. Description of the Related Art

A variety of types of rotary electric apparatuses have now been used, one type of which is proposed by Japanese Patent Laid-open publication No. 2002-335657. This publication provides a rotary electric apparatus which is realized as an electric motor and an electric generator, which have a stator having a stator core around which stator windings are wound. The stator windings are connected with lead wires which extend axially in order to electrically connect with other electric parts. Specifically, the lead wires extend out backward from a coil-end block in the axial direction, and wired along the coil-end block so that the lead wires extend backward axially to connect with a rectifier. Other than those lead wires, the stator windings are electrically connected with each other by a connector near to the coil-end block and the connector is arranged to axially protrude more than the coil-end block.

In the above construction taught by the publication, the lead wires drawn out of the stator windings are arranged along the coil-end block to given positions corresponding to connections of the rectifier. However, as the wiring along the coil-end block becomes longer, the lead wires are likely to cause vibration, which may lead to breaking of the wires. In other words, there is a problem that the lead wires are obliged to have a decrease in durability.

Additionally, the lead wires connecting to the rectifier extend backward more than the coil-end block in the axial direction, which may prevent welding jigs from moving. However, the welding jigs are used during a welding process to form the connector being protruded from the coil-end block. Thus, this will affect the productivity of the rotary electric apparatus.

SUMMARY OF THE INVENTION

In light of the foregoing circumstances, the present invention has been made. An object of the present invention is to provide a rotary electric apparatus of which durability is higher and which can be produced at an improved productivity.

In order to realize the above object, as one aspect, the present invention provides a rotary electric apparatus, comprising: a rotor having an axial direction and rotating together with a rotation shaft arranged along the axial direction, a radial direction being perpendicular to the rotation shaft and a circumferential direction being around the rotation shaft; and a stator, arranged to face to the rotor in the radial direction, having a cylindrical stator core, a stator winding wound in the stator core to have coil-end blocks arranged to protrude respectively from both ends of the stator core in the axial direction and being arranged on both sides of the stator core in the circumferential direction, and a lead wire taken from the windings, wherein the lead wire includes a first wire portion taken along the axial direction from one of the coil-end blocks, a second wire portion extended from the first wire portion and arranged partly along the circumferential direction to be secured with resin material on the one of the coil-end blocks, and a third wire portion extended from the second wire portion and arranged outwards in the radial direction.

For example, the lead wire is composed of a plurality of lead wires each having the second wire portion, the plurality of second wire portions being arranged close to each other and secured with the resin material.

For example, the stator winding consists of three-phase windings formed by three phase windings to be connected to each other so that the lead wire consists of three lead wires each having the second wire portion to be secured on the one of the coil-end blocks.

As another aspect of the present invention, there is provided a rotary electric apparatus, comprising: a rotor having an axial direction and rotating together with a rotation shaft arranged along the axial direction, a radial direction being perpendicular to the rotation shaft and a circumferential direction being around the rotation shaft; and a stator, arranged to face the rotor in the radial direction, having a cylindrical stator core, a stator winding wound in the stator core to have coil-end blocks arranged to protrude respectively from both ends of the stator core in the axial direction and being arranged on both sides of the stator core in the circumferential direction, and a lead wire taken from the windings, wherein the lead wire includes a wire portion taken from one of the coil-end blocks and arranged partly along the circumferential direction to be secured with resin material on the one of the coil-end blocks,

DETAILED DESCRIPTION OF THE PREFERRED EMBODIMENTS

With reference accompanying drawings, a rotary electric apparatus according to an embodiment of the present invention will now be described.

The present embodiment will be described about an electric motor (simply, referred to as a motor) employed as the rotary electric apparatus for vehicles.

Figure 1:
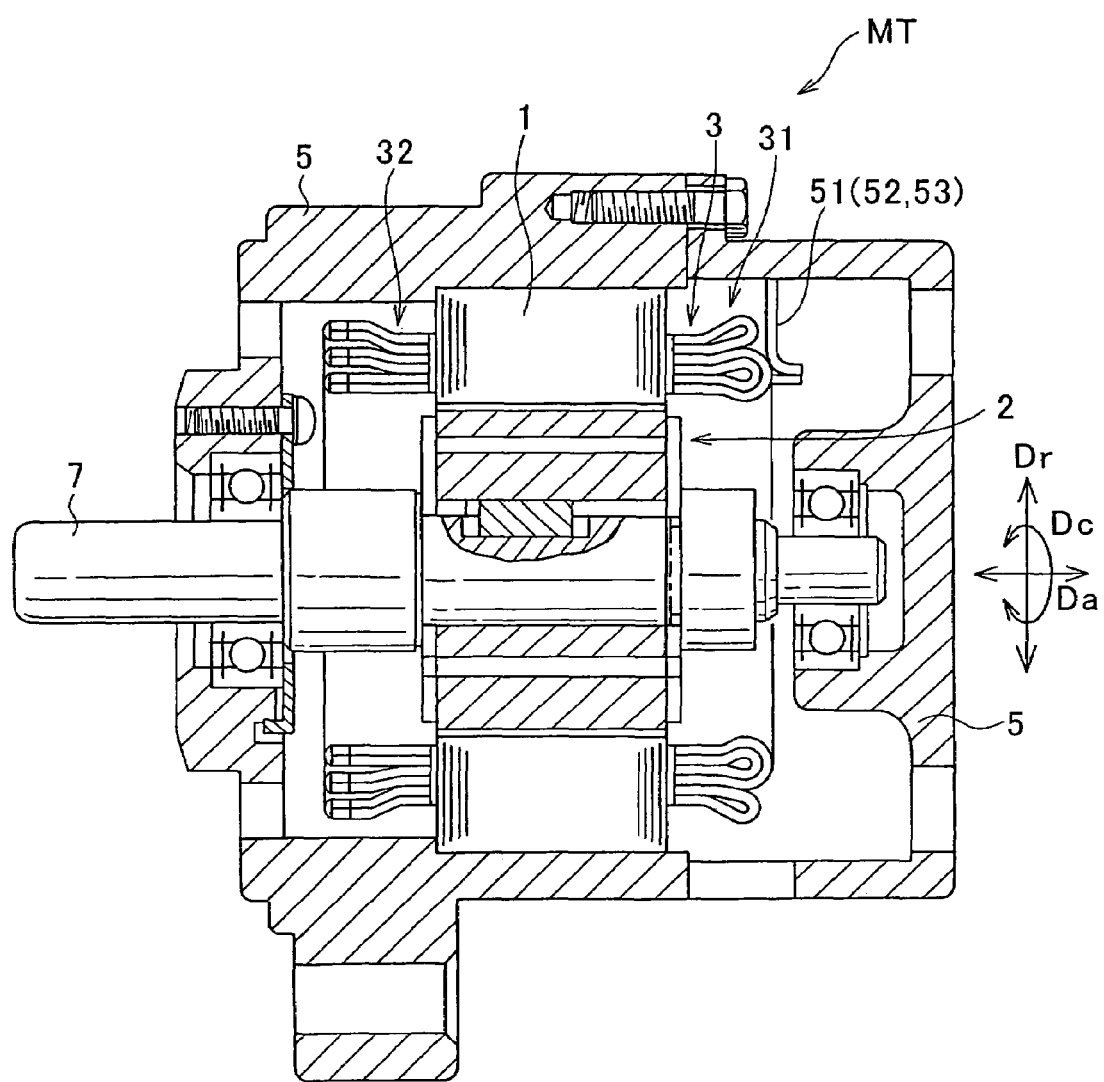
FIG. 1 is a sectional view showing an axial section of an electric motor employed as the rotary electric apparatus according to an embodiment of the present invention.
Figure 2:
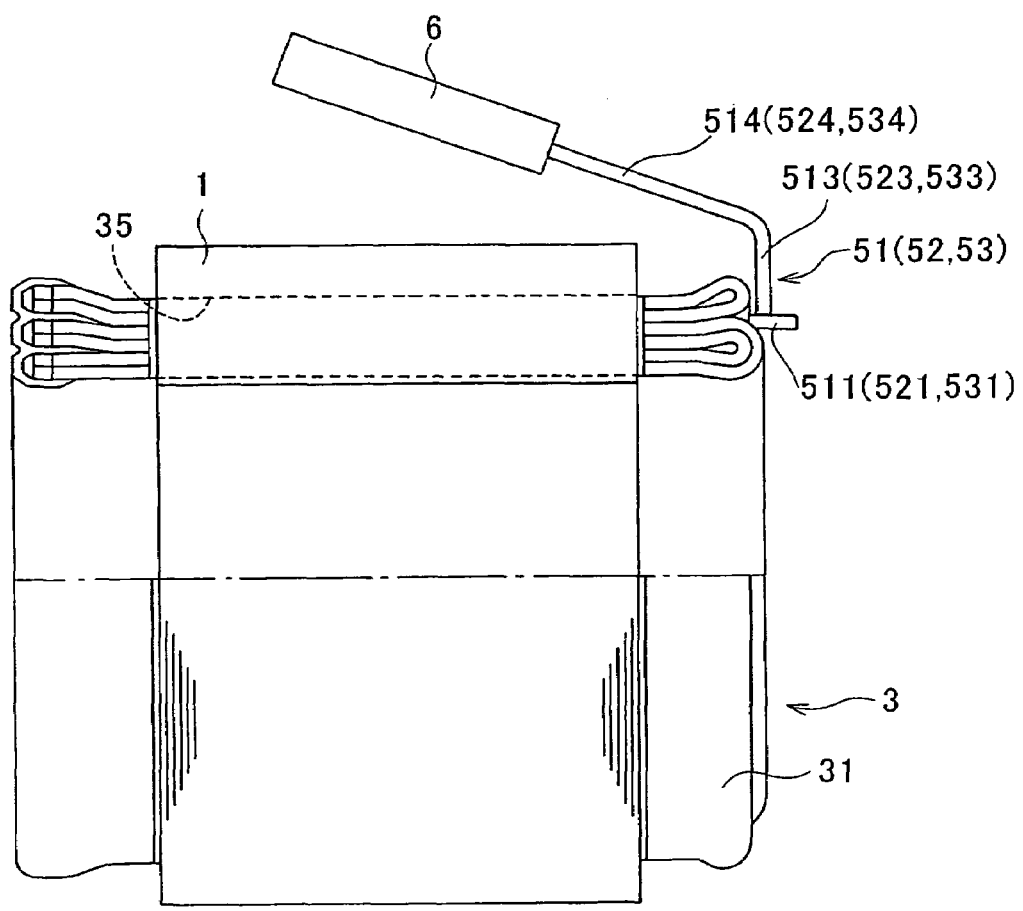
FIG. 2 is a partly sectioned side view shoring a stator accommodated in the motor.

FIG. 1 shows an axial sectional view of a motor MT and FIG. 2 shows a partially cut section of a stator incorporated in the motor MT.

As shown in FIGS. 1 and 2, the motor MT according to the present embodiment is provided with an approximately cylindrical housing 5 which contains a stator core 1, a rotor 2, stator windings 3, lead wires 51, 52 and 53, and a long rotary shaft 7.

By the way, in the present embodiment, a direction along the rotary shaft 7 is referred to as an "axial direction (refer to a reference Da in FIG. 1)," a radial direction along a plane perpendicular to the rotary shaft 7 to as a "radial direction (refer to a reference Dr in FIG. 1)," and a direction depicting circles around the rotary shaft 7 on the perpendicular plane to as a "circumferential direction (refer to a reference Dc in FIG. 1)."

Of the foregoing listed components, the stator core 1 is shaped into a cylinder and secured on the inner wall of the housing 5. The stator windings 3 are wound around slots formed axially across the stator core 1. The lead wires 51, 52 and 53, which are connected to the stator windings 3, are drawn out from the stator windings 3 toward a terminal 6 (refer to FIG. 2) and electrically mutually connected by the terminal 6. These elements, that is, the stator core 1, stator windings 3, and lead wires 51, 52 and 53 compose a stator arranged outside the rotor 2 in the radial direction.

The stator windings 3 have first and second coil-end blocks 31 and 32 positioned on both of the axial end sides of the stator core 1, wherein one coil-end block 31 are protruded from one axial end of the stator core 1 and extended along axially and the other coil-end block 32 are protruded from the remaining axial end of the stator core 1. The stator windings 3 are composed of three-phase windings, which are powered from an externally placed three-phase inverter controller (not shown) through the terminal 6.

Meanwhile, the rotor 2 is formed into an IPM (interior permanent magnetic) type of rotor secured on the rotor shaft 7 rotatably sustained by the housing 5 and placed inside the stator core 1 in the radial direction.

Figure 3:
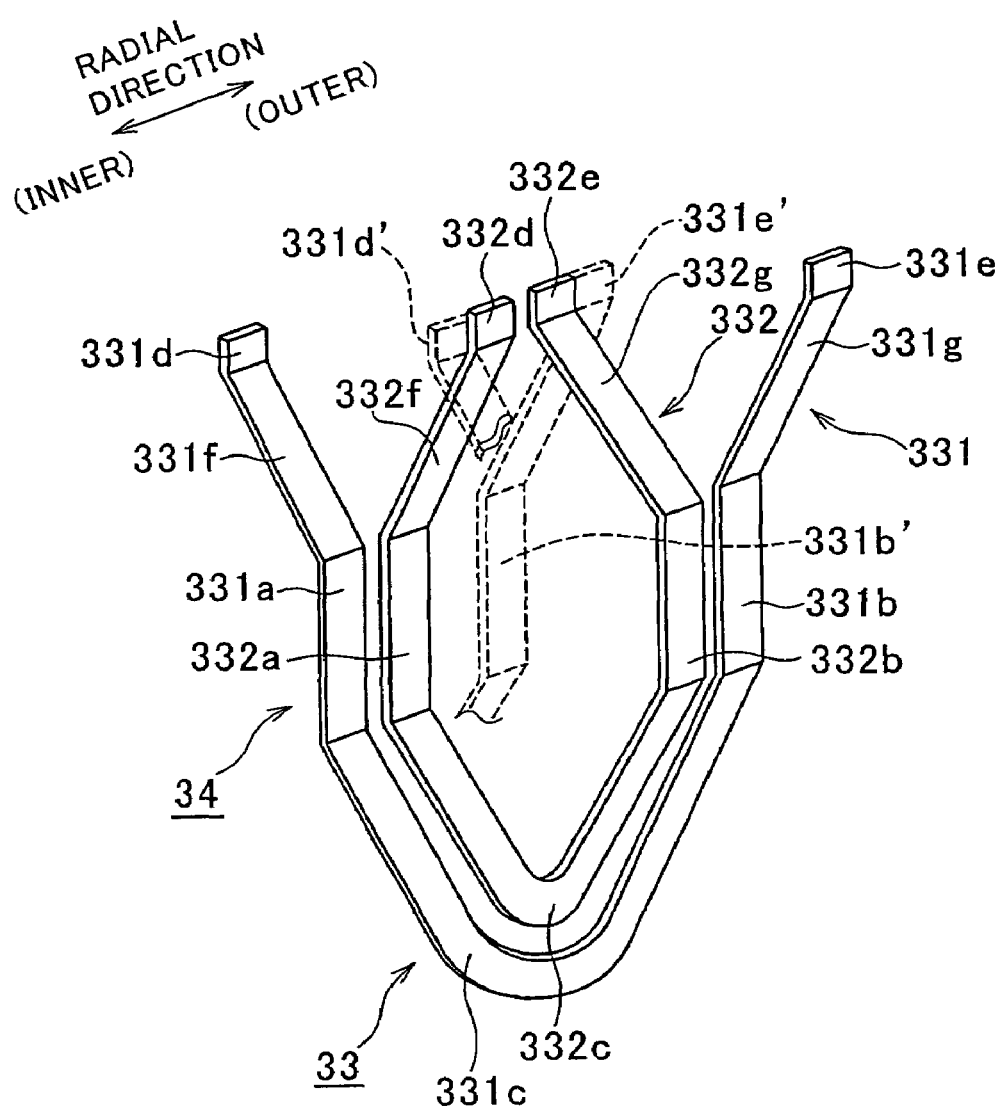
FIG. 3 is a perspective view of a set of coil segments that compose part of stator windings of the stator.

The three-phase windings 3 have a plurality of coil segment 33 whose winding pattern is predetermined and whose section is a plate-like, as shown in FIG. 3. Each coil segment 33 is inserted, from one end thereof, into one axial end of each slot of the stator core 1 in such a manner that the other end of each coil segment 33 becomes a running-off end which is made to protrude a predetermined length from the other axial end of each slot. The running-off end of each coil segment 33 is twisted by an electrical angle of about π/2 in the circumferential direction. The tips (i.e., connected parts) of running-off ends of the respective coil segments 33 are combined appropriately to form the three-phase windings and welded to each other. Each coil segment 33 is formed into a U-shape member having the tips (also referred to as a "tip end," which is subjected to the welding) and the remaining part other than the tips. The remaining part is coated with a resin layer (insulative layer).

Figure 4:
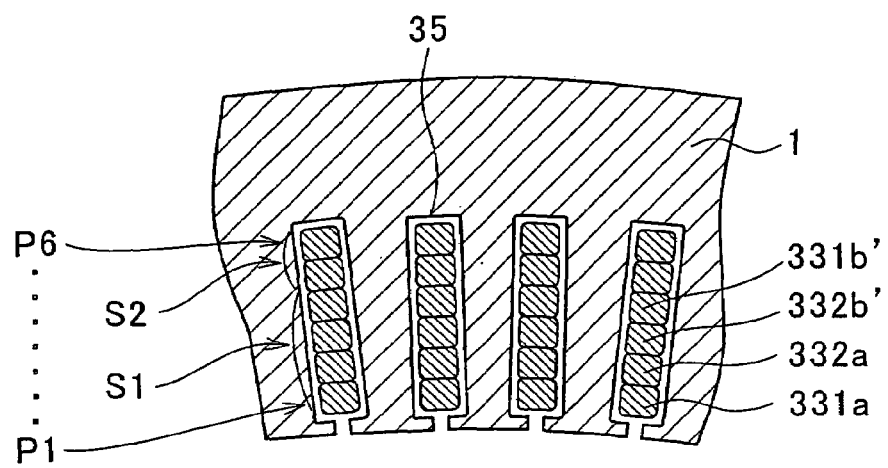
FIG. 4 is an illustration explaining embedded coil segments in each slot of a stator core formed through the stator core.

As shown in FIGS. 1, 2 and 4, the stator windings 3 according to the present embodiment are structured in each slot 35 so as to form a six layered structure. Concretely, each slot accommodates a first set of coil segments S1 composed of four conductors located innermost in the radial direction and consisting of the large and small coil segments 33 shown in FIG. 3 and a second set of coil segments S2 composed of two conductors outwardly outermost in the radial direction and consisting of a single coil segment 33 similar to the coil segments shown in FIG. 3. The conductors which are made reference are portions of the coil segments 33.

The first set of coil segments S1, which is of the two coil segments 22, will now be detailed. As illustrated in FIG. 3, each coil segment 33 has a head portion which is an approximately V-shaped clinched part, a pair of conductor portions each extend straight from each of both ends of the head portion and accommodated in each slot of the stator core 1, and a pair of running-off ends each extending straight from the end of each conductor portion. In the present embodiment, hereinafter, these two coil segments 33 will be referred to as a smaller coil segment 332 and a larger coil segment 331 to be wound to surround the smaller one 332.

Incidentally, before being inserted into each slot 35 of the stator core 1, each of the smaller and larger coil segments 332 and 331 have no running-off ends. Thus, in each coil segment 331 (332), each of the conductor portions extends straight to form a straight running-off end.

When viewing the stator windings 3 composed of the coil segments 33 shown in FIG. 3, the stator windings 3 are sectioned into three portions, which are a first coil-end block 31 located on one axial end side of the stator core 1 so as to form a ring-like member composed of the head portions of the respective coil segments 33, a second coil-end block 32 located on the other end side of the stator core 1 so as to also form a ring-like member composed of the running-off ends of the respective coil segments 33, and a conductor part 34 embedded in the slots 35. Hence, the first coil-end block 31 is composed of the head potions of the respective coil segments 33, while the second coil-end block 32 is composed of the running-off ends of the respective coil segments 33.

As shown in FIG. 3, each larger coil segment 331 is therefore composed of in-slot conductor portions 331a and 331b (composing part of the conductor part 34), a U-shaped head portion 331c, and running-off ends 331f and 331g having tips 331d and 331e, respectively. These tips 331d and 331e serve as parts to be joined to other tips, so that the tips are also referred to as joined portions.

Each smaller coil segment 332 is also composed of in-slot conductor portions 332a and 332b (composing a part of the conductor part 34), a U-shaped head portion 332c, and running-off ends 332f and 332g having tips 332d and 332e, respectively. These tips 332d and 332e serve as parts to be joined to other tips, so that the tips are also referred to as joined portions.

FIG. 3 illustrates some imaginary lines with apostrophized reverences showing parts of other coil segments, which are identical in their configurations to that shown by the same non-apostrophized references, but different in arrangement pitches. In the depiction in FIG. 3, a bonded portion 332d of the smaller coil segment 332 and a bonded portion 331d' of a larger coil segment (not shown) which are mutually adjacent in the radial direction are welded together, while a bonded portion 332e of the smaller coil segment 332 and a bonded portion 331e' of a larger coil segment (not shown) which are mutually adjacent in the radial direction arc welded together.

As to the paired larger and smaller coil segments 331 and 332 shown in FIG. 3, assume that the in-slot conductor portion 331a and in-slot conductor portion 332a are allocated respectively at the innermost layer and the second-innermost layer in the first set of coil segments S1 in a certain slot 35 of the stator core 1. In such a case, the in-slot conductor portion 331*b* and in-slot conductor portion 332*b* are allocated respectively at the outermost layer and the second-outermost layer in the first set of coil segments S1 in another slot 35 (refer to FIG. 4) which is located apart from the foregoing slot 35 by a pitch T corresponding to a given odd number of magnetic poles (for example, one magnetic pole (corresponding to an electrical angle of π). In addition, the head portion 332*c* of the smaller coil segment 332 is surrounded by that 331*c* of the larger coil segment 331.

FIG. 4 illustrates the allocation of the in-slot conductor portions in each slot 35 of the stator core 1. As shown, each slot 35 has six conductor arrangement layers (positions) P1 to P6, which are mutually adjacent along the radial direction. At the conductor arrangement layers P1 to P6, six in-slot conductor portions are accommodated one by one. In each slot 35, the two set of coil segments S1 and S2 are arranged (wound) in this order, so that the conductor arrangement layers P1 to P4 are occupied by the first set of coil segment S1 and those P4 and P5 by the second set of coil segment S2.

Of these coil segments, the first set of coil segment S1, which is located on the radially inner side, will now be detailed from an arrangement viewpoint thereof. The in-slot conductor portion 331*a* is arranged at the radially innermost arrangement layer in each slot 35 of the stator core 1. On this in-slot conductor portion 331*a*, the in-slot conductor portion 332*a*, 332*b'*, and 332*b'* are arranged one on another (but insulated therebetween) in this order to be piled up outwardly along each slot 35. Hence the second-innermost, second-outermost, and outermost layers of the conductor portions are formed in each slot 35. In other words, each slot 35 accommodates the four in-slot conductor portions formed in a four-layered, one-line attitude.

In the example of FIG. 4, the in-slot conductor portions 331*b'* and 332*b'* are parts of another pair of larger and smaller coil segments that are different from the larger and smaller coil segments 331 and 332 having the in-slot conductor portions 331*a* and 332.

In contrast, the second set of coil segments S2 in each slot 35 is different from the first set of coil segments S1 in that one of the larger and smaller coil segments 331 and 332 is removed (for instance, the smaller coil segment 332 is removed in each slot 35).

Figure 5:
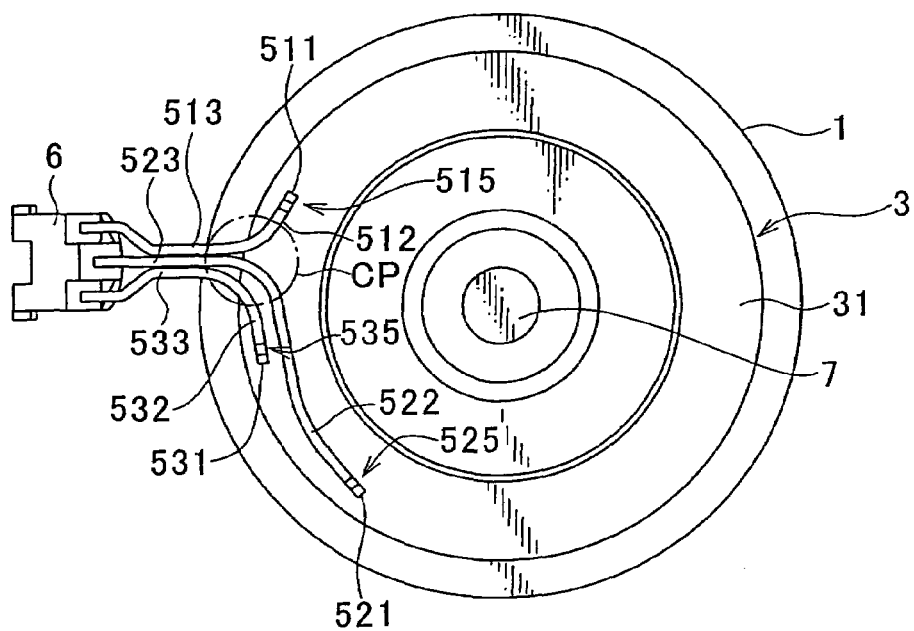
FIG. 5 is an axial side view explaining arrangement of lead wires extended from the stator windings.
Figure 6:
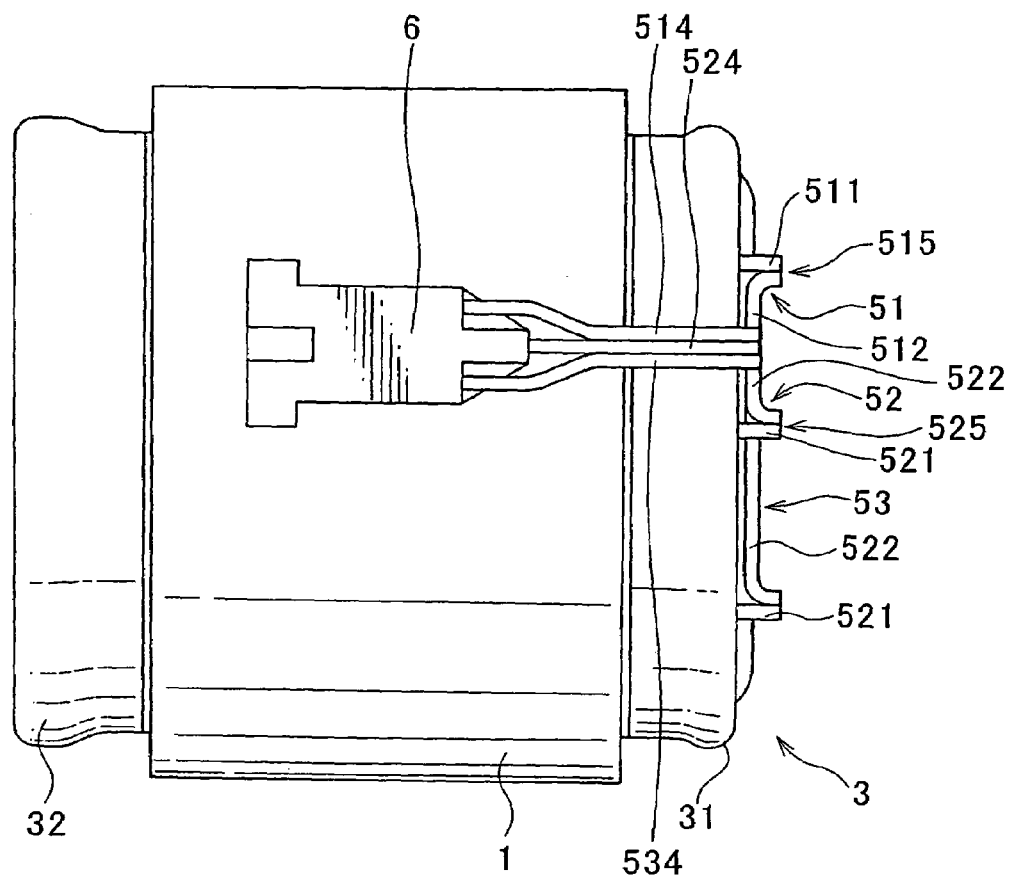
FIG. 6 is a side view explaining the arrangement of the lead wires to a terminal.

Referring to FIGS. 5 and 6, the lead wires 51, 52 and 53 connecting the stator windings 3 and the terminal 6 will now be described.

FIGS. 5 and 6 illustrate how to draw out the lead wires 51, 52 and 53 from the stator windings 3. As described, the stator windings 3 are for three-phase windings, thereby providing the three lead wires 51, 52 and 53.

Of the three lead wires 51, 52 and 53, the lead wire 51 includes a first axially arranged wire portion 511 (i.e., the first wire portion), a circumferentially arranged wire portion 512 (i.e., the second wire portion), a radially arranged wire portion 513 (i.e., the third wire portion) and a second axially arranged wire portion 514 (i.e., the fourth wire portion).

The first axially arranged wire portion 511 is a wire portion drawn out axially from the first coil-end block 31 and constitutes an end of one of the three-phase stator wirings 3. The circumferentially arranged wire portion 512 is composed of a wire portion connected to the first axially arranged wire portion 511 and arranged along an axial side of the first coil-end block 31, as shown in FIGS. 5 and 6. The radially arranged wire portion 513 is a wire portion connected to the circumferentially arranged wire portion 512 to extend outwards in the radial direction. Further, the second axially arranged wire portion 514, which is connected to the radially arranged wire portion 513, extends axially to return to the first coil-end block 31.

As will be understood from the above, the first axially arranged wire portion 51 is part itself of the conductor that composes one of the stator windings 3. In contrast, actually, the remaining circumferentially, radially and axially arranged wire portions 512, 513 and 514 are composed of another single continuous conductor, which is a different wire portion from the first axially arranged wire portion 511.

The circumferentially arranged wire portion 512 has the end bent perpendicularly, arranged in the axial direction, and connected with the end of the anally arranged wire portion 511. This connection is made such that the insulating coatings of both ends are peeled off and bonded with each other using welding, for example. Thus, this connection is realized by a bonded portion (welded portion) 515, as shown in FIGS. 5 and 6. This bonded portion 515 is positioned to protrude more than the circumferentially arranged wire portion 512 in the axial direction.

In addition, the circumferentially arranged wire portion 512 is arranged to almost touch the surface of the first coil-end block 31 in the axial direction and creep in the circumferential direction. As shown in FIGS. 2 and 5, the circumferentially arranged wire portion 512 is changed to the radially arranged wire portion 513 with a curved wire portion therebetween, and the radially arranged wire portion 513 is changed to the second axially arranged wire portion 514 with a further curved wire portion therebetween. The second axially arranged wire portion 514 has, as shown in FIG. 5, a body which is substantially straight and the tip of the body is connected with a given connection position of the terminal 6. Thus the wire portion 514, that is, lead wire 51 realizes an electrical and mechanical connection with the terminal 6.

In the similar way to the above, the lead wire 52 includes a first axially arranged wire portion 521 (i.e., the first wire portion), a circumferentially arranged wire portion 522 (i.e., the second wire portion), a radially arranged wire portion 523 (i.e., the third wire portion) and a second axially arranged wire portion 524 (i.e., the fourth wire portion). The first axially arranged wire portion 521 is a wire portion drawn out axially from the first coil-end block 31 and constitutes an end of one of the three-phase stator wirings 3. The circumferentially arranged wire portion 522 is composed of a wire portion connected to the first axially arranged wire portion 521 and arranged along the axial side of the first coil-end block 31, as shown in FIGS. 5 and 6. The radially arranged wire portion 523 is a wire portion connected to the circumferentially arranged wire portion 522 to outwards extend in the radial direction. Further, the second axially arranged wire portion 524, which is connected to the radially arranged wire portion 523, extends axially to return to the first coil-end block 31.

Furthermore, the lead wire 53 includes a first axially arranged wire portion 531 (i.e., the first wire portion), a circumferentially arranged wire portion 532 (i.e., the second wire portion), a radially arranged wire portion 533 (i.e., the third wire portion) and a second axially arranged wire portion 534 (i.e., the fourth wire portion). The first axially arranged wire portion 531 is a wire portion drawn out axially from the first coil-and block 31 and constitutes an end of one of the three-phase stator wirings 3. The circumferentially arranged wire portion 532 is composed of a wire portion connected to the first axially arranged wire portion 531 and arranged along the axial side of the first coil-end block 31, as shown in FIGS. 5 and 6. The radially arranged wire portion 533 is a wire portion connected to the circumferentially arranged wire portion 532 to outwards extend in the radial direction. Further, the second axially arranged wire portion 534, which is connected to the radially arranged wire portion 533, extends axially to return to the first coil-end block 31.

All the lead wires 51 to 53 have the same structural features, except that they are drawn out at different positions of the first coil-end block 31.

The three circumferentially arranged wire portions 512, 522 and 532, which are parts of the three lead wires 51, 52 and 53, are arranged to converge on the same circumferential position CP (refer to FIG. 5). The wire portions 512, 622 and 523 then run respectively into the three radially arranged wire portions 513, 523 and 533, which are arranged close to each other in a mutually parallel form.

Figure 7:
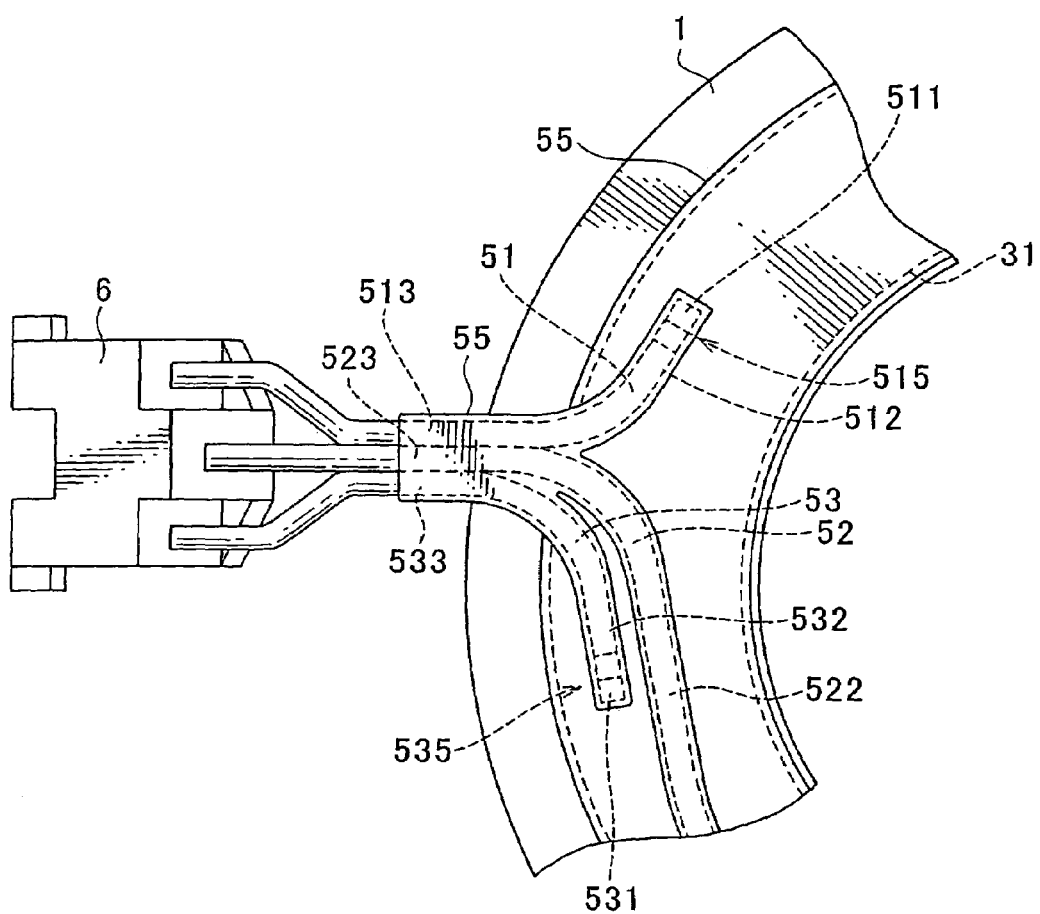
FIG. 7 is a partial side view showing resin member partially covering the lead wires.

In the present embodiment, a regional necessary part of both of the first coil-end block 31 and the lead wires 51 to 53, which is far from the axial side surface of the stator core 1 by a distance L1, is coated with a resin member (material) 55. This coated state is illustrated in FIGS. 7 to 9, which show the resin member 55 which covers in part the first coil-end block 31 and others.

The resin member 55 is formed by applying, for example, epoxy powdered resin to the foregoing regional part, and then by hot-curing the applied powered resin. Specifically, with the overall stator core 1 heated, the regional part (and a preceding part therefrom) defined by the distance L1 is immersed in fluidized powdered resin to make the powdered resin adhere to the immersed portion, and then subjected to hot curing. This operation allows the immersed portion to have the resin member 55.

Figure 8:
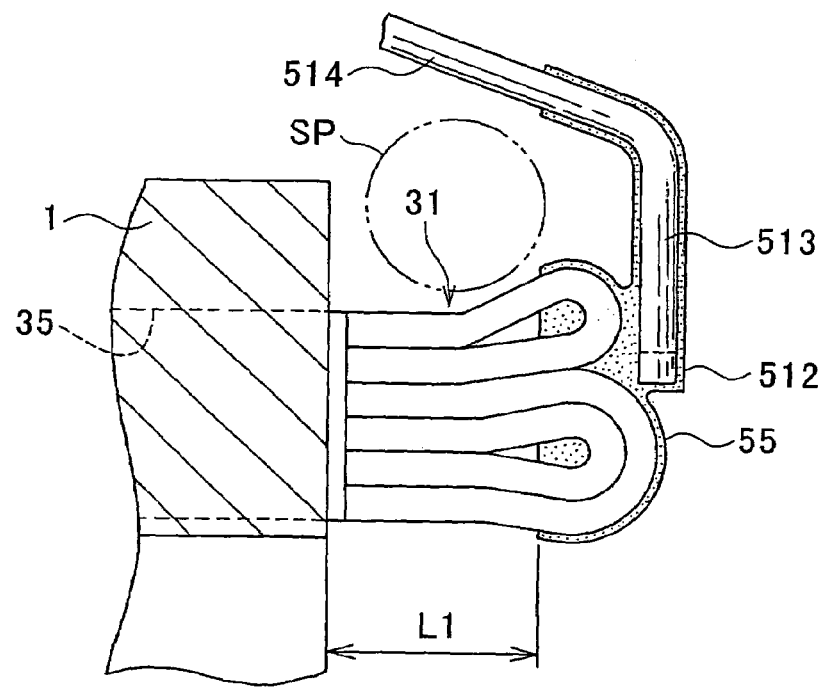
FIG. 8 is a partial side view showing the arrangement of the resin member on a coil-end block.
Figure 9:
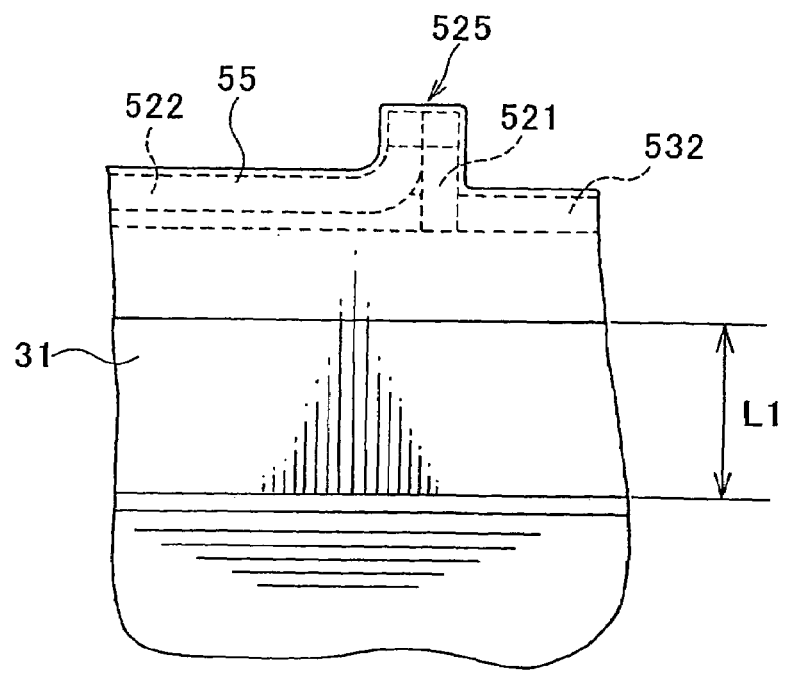
FIG. 9 is a plan view showing the arrangement of the resin member.

As shown in FIGS. 8 and 9, with the resin member 55 which has been formed as above, the circumferentially arranged wire portion 512, 522 and 532 are individually bonded and secured to the axial side of the first coil-end block 31. Concurrently, as shown in FIG. 7, the three radially arranged wire portions 513, 523 and 533, which are close to each other and in parallel with each other, are mutually bonded for fixing.

In this way, the motor MT according to the present embodiment has the configuration in which the lead wires 51 to 53 have the circumferentially arranged wire portions 512, 522 and 532 individually bonded to the first coil-end block 31 so as to be fixed thereto. For this reason, for example, even when the circumferentially arranged wire portion 512 of the lead wire 51 becomes longer due to the fact that the positions between the first axially arranged wire portion 511 and the radially arranged wire portion 513 are relatively distant, it is possible to avoid stress being made on the bonded portion 515 even for use in conditions with much vibration caused in the motor MT itself and outside thereof. Hence, the bonded portion 515 can be prevented from being broken. This advantage is true of the remaining lead wires 52 and 53, thereby improving the durability of the motor MT.

Additionally, when exemplifying the lead wire 51, the radially arranged wire portion 513 positions to connect to the circumferentially arranged wire portion 512 so that the lead wire 51 can be dawn out radially so as to leave a space SP above the first coil-end block (refer to FIG. 8). Hence a junction for a neutral point necessary for the stator windings 3 and other junctions necessary for the phase windings are located in the neighborhood of the first coil-end block 31, welding jigs for the junctions are prevented from being interfered with the lead wire 51. This advantage can also be applied to the remaining lead wires 52 and 53. Thus productivity in producing the motor MT can be improved.

In addition to the foregoing, the motor MT according to the present embodiment is able to provide a variety of other advantages.

First, the lead wires 51 to 53 are arranged, in which the three radially arranged wire portions 513, 523 and 533 come close to each other and mutually fixed by the resin member 55 (refer to FIG. 7). It is therefore possible to suppress or avoid stress from concentrating at the bonded portion 515, even when the motor MT is used in conditions with much vibration. This is also effective for strengthening the breakage-preventing performance necessary for the bonded portion 515, thus further improving the durability of the motor MT.

The first axially arranged wire portions 511, 521 and 531 are made of a wire member different from the other wire potions 512 and others, and the bonded portions 515, 525 and 535 intervene between those different wire members for establishing electrical connections therebetween. This wiring makes it possible that both of the stator wirings 3 and the circumferentially arranged wire portion 512 (522, 532) of each lead wire 51 (52, 53) and successive wire portions 513 and 514 (523 and 524; 533 and 534) therefrom are produced separately from each other, before being bonded together. Thus the processes to produce the stator windings 3 can be simplified and the handling work for the stator windings 3 can be made easier, leading to an improved productivity rate.

In addition, as shown in FIG. 6, the bonded portions 515, 525 and 535 are located to be farther from the axial side of the stator core 1 than the circumferentially arranged wire portions 512, 522 and 532 in the axial direction. Thus welding jigs can be moved with lesser limitations during a bonding operation for the bonded portions 515, 525 and 535.

In the present embodiment, the resin member 55 functions as covering means for the bonded portions 515, 525 and 535, thus protecting those bonded portions, as well as fixing means for fixing the circumferentially arranged wire portions 512, 522 and 532. The multiple functions of the resin member 55 are helpful in reducing the number of parts and in simplifying the production processes, thus contributing to a reduction in manufacturing cost.

In the respective lead wires 51, 52 and 53, the tips of the radially arranged wire portions 513, 523 and 533 are extended to provide the second axially arranged wire portions 514, 524 and 534 returning toward the stator core 1 in the axial direction, along which the first axially arranged wire portions 511, 521 and 531 are also directed. Hence there is no need to extend the lead wires 51, 52 and 53 in the axial direction going away from the first coil-end block 31. This eliminates deformations of the lead wires 51 to 53, which are forcibly caused when the lead wires 51 to 53 are protruded largely in the axial direction, whereby it is possible to improve the productivity thanks to a reduction in manually-amending work for such probable deformations.

Moreover, the tips of the second axially arranged wire portions 514, 524 and 534 are connected with the terminal 6 and secured thereto. It is therefore possible to suppress the deformations of the lead wires 51 to 53, thus leading to a reduction in the manually-amending work, thus leading to an improved productivity for the motor MT.

The resin member 55 is placed to cover the first coil-end block 31 and the wire portions, which are far from the axial side of the stator core 1 by a distance of L1 or more, as shown in FIG. 8. This eliminates the need for making dimension management complicated, but the resin member 55 can be formed to satisfy a dimension in its height direction. The production processes can therefore be made simpler and productivity can be made higher.

In addition, the heat-cured powdered resin adhered through the fluidized immersion process (or fluidized-bed coating process) is used to form the resin member (material) 55. This can be done by only immersing, in part, once, the stator core 1 with the lead wires 51 to 53 into the powdered resin in a container. Hence, compared with applying resin material to necessary portions, part by part, the production processes can be made shortened, thus raising the productivity.

The wire portions 512 to 514 (522 to 524, 532 to 534) of each lead wire 515 (525, 535), which are folded toward the first coil-end block 31, is made of a different wire piece from the first axially arranged wire portion 511 (521, 531). Thus, after forming each of those different wire pieces into a predetermined shape, the predetermined-shaped wire pieces can be bonded to the axially arranged wire portion 511 (521, 531) of the stator windings 3 already assembled with the stator core 1. That is, only the mutual-connections of the wire pieces will lead to completion of the overall stator core 1. In contrast, each of the lead wires 51, 52 and 53 might be formed by a single continuous wire, but in such a case, it is required that each lead wire protruding largely from the first coil-end block 31 in the axial direction be folded back to form a predetermined lead-wire shape. This folding-back operation is considerably complex. In the present embodiment, however, this complex folding-back operation can be avoided, thus simplifying the production processes.

The present invention may be embodied in several other forms without departing from the spirit thereof. The foregoing embodiments and modifications thereof as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

A first modification concerns the formation of the resin member 55. The foregoing formation processes of the resin member 55 are not a decisive list. For example, liquid material composed of for example liquid epoxy can be dropped or sprayed for adhesion, which will followed by heat curing.

A second modification is concerned with a region to which the resin member 55 is applied. In the foregoing embodiment, such a region is determined based on the distance L1 measured from the axial side of the stator core 1 (refer to FIG. 8). Instead, the resin member 55 may be produced such that the bonded portions 515, 525 and 535 (if required, including conjunctions for the neutral point, connecting the phase windings, and others), parts of the circumferentially arranged wire portions 512, 522 and 532 which are along the first coil-end block 31, and parts of the radially arranged wire portions 513, 523 and 533 which are opposed to each other are subjected to selective formation of the resin member 55.

A third modification is another mode for fixing the radially arranged wire portions 513, 523 and 533. It is not always decisive to fix all the wire potions 513, 523 and 533 at the same one position by bonding with the resin member. 55. By way of another example, only two radially-arranged wire portions (including a wire portion of which vibration is largest due to, for example, be the longest) may be adhered for fixing.

Further, a fourth modification concerning with about wire pieces for each lead wire is still provided. The foregoing embodiment has described such that, if exemplifying one lead wire 51, a wire piece different from the axially arranged wire portion 511 is used for the other wire portions 512, 513 and 514 and the bonded portion 515 is used to connect both the wires. However, according to need, a one continuous wire may be used to form all the wire portions 511 to 514.

A sixth modification is directed to the thickness of the resin member 55. As shown in FIG. 8, the resin member 55 is formed to have a predetermined thickness (layer thickness) which is almost constant, regardless of positions along the wire portions 514 etc. A variation is to form a resin member of which layer thickness becomes thinner little by little as the positions along a wire portion approach the end. This is also advantageous in reducing an excessive stress caused at a boundary area between the region with and without resin members on each wire portion. If the thickness of a resin material, which is rigid, is constant, the boundary area is likely to bend, owing to the fact that such an area tends to become a node of vibration. However, the resin material whose thickness is reduced gradually, as described, is able to prevent or diminish the concentration of such an excessive stress.

Applications of the rotary electric apparatus according to the present invention can still be widened, not limited to the application for the electric motor described above. Other apparatuses, such as electric generator, can be reduced into practice based on the gist of the present invention.

What is claimed is:

1. A rotary electric apparatus, comprising:
 a rotor having an axial direction and rotating together with a rotation shaft arranged along the axial direction, a radial direction being perpendicular to the rotation shaft and a circumferential direction being around the rotation shaft; and
 a stator, arranged to face to the rotor in the radial direction, having a cylindrical stator core, a stator winding wound in the stator core to have coil-end blocks arranged to protrude respectively from both ends of the stator core in the axial direction and being arranged on both sides of the stator core in the circumferential direction, and a lead wire drawn from the stator winding and composed of a plurality of lead wires,
 wherein each of the lead wire includes
 a first wire portion drawn from one of the coil-end blocks along the axial direction,
 a second wire portion extended from the first wire portion and arranged partly along the circumferential direction to be secured with resin material on the one of the coil-end blocks such that (i) the second wire portions of the plural lead wires are arranged close to each other and secured with the resin material, and (ii) each of the second wire portions is made of a member separated from each of the first wire portions and electrically connected in series to each of the first wire portions to form an electrical connected portion, and
 a third wire portion extended from each of the second wire portions and arranged outwards in the radial direction.

2. The rotary electric apparatus according to claim 1, wherein the stator winding consists of three-phase windings formed by three phase windings that are connected to each other so that the lead wires consist of three lead wires.

3. The rotary electric apparatus according to claim 2, wherein the connected portion is located apart from one of the ends of the stator core in the axial direction, the one of the coil-end blocks being protruded from the one end of the stator core in the axial direction more than the second wire portion.

4. The rotary electric apparatus according to claim 3, wherein the resin material is coated to cover the connected portions.

5. The rotary electric apparatus according to claim 4, wherein each of the lead wires has a fourth wire portion extended from the third wire portion in the axial direction.

6. The rotary electric apparatus according to claim 5, wherein the fourth wire portion has an end to be electronically connected to a terminal for supply of power.

7. The rotary electric apparatus according to claim 1, wherein the connected portion is located apart from one of the ends of the stator core in the axial direction, the one of the coil-end blocks being protruded from the one end of the stator core in the axial direction more than the second wire portion.

8. The rotary electric apparatus according to claim 7, wherein the resin material is coated to cover the connected portions.

9. The rotary electric apparatus according to claim 8, wherein each of the lead wires has a fourth wire portion extended from the third wire portion in the axial direction.

10. The rotary electric apparatus according to claim 9, wherein the fourth wire portion has an end to be electronically connected to a terminal for supply of power.

11. The rotary electric apparatus according to claim 10, wherein the first to third wire portions of each of the lead wires and the one of the coil-end blocks are located at a predetermined distance apart from the one of the ends of the stator core in the axial direction and coated with the resin material.

12. The rotary electric apparatus according to claim 11, wherein the resin material is powdered resin accreted through fluidized-bed coating and then subjected to a thermal curing process.

13. The rotary electric apparatus according to claim 1, wherein the first to third wire portions of each of the lead wires and the one of the coil-end blocks are located at a predetermined distance apart from the one of the ends of the stator core in the axial direction and coated with the resin material.

14. The rotary electric apparatus according to claim 13, wherein the resin material is powdered resin accreted through fluidized-bed coating and then subjected to a thermal curing process.

* * * * *